(12) United States Patent
Sueyoshi

(10) Patent No.: US 11,965,963 B2
(45) Date of Patent: Apr. 23, 2024

(54) LASER RADAR

(71) Applicant: DENSO WAVE INCORPORATED, Aichi-pref. (JP)

(72) Inventor: Eiichi Sueyoshi, Chita-gun (JP)

(73) Assignee: DENSO WAVE INCORPORATED, Aichi-pref (JP)

(*) Notice: Subject to any disclaimer, the term of this patent is extended or adjusted under 35 U.S.C. 154(b) by 119 days.

(21) Appl. No.: 17/512,054

(22) Filed: Oct. 27, 2021

(65) Prior Publication Data

US 2022/0128691 A1 Apr. 28, 2022

(30) Foreign Application Priority Data

Oct. 27, 2020 (JP) .................... 2020-179820

(51) Int. Cl.
*G01S 17/00* (2020.01)
*G01S 7/4865* (2020.01)
*G01S 17/14* (2020.01)

(52) U.S. Cl.
CPC ............ *G01S 17/14* (2020.01); *G01S 7/4865* (2013.01)

(58) Field of Classification Search
USPC ....................................... 356/5.01
See application file for complete search history.

(56) References Cited

U.S. PATENT DOCUMENTS

| | | |
|---|---|---|
| 5,128,624 A | 7/1992 | Hoshino et al. |
| 5,289,135 A | 2/1994 | Hoshino et al. |
| 5,568,071 A | 10/1996 | Hoshino et al. |
| 8,766,682 B2* | 7/2014 | Williams ............... G01S 17/14 327/147 |
| 2013/0188766 A1* | 7/2013 | Williams ............... G01S 17/14 377/19 |
| 2015/0331112 A1* | 11/2015 | Stettner ................. G01S 7/4814 701/28 |
| 2018/0149753 A1* | 5/2018 | Shin ...................... G01S 7/4811 |
| 2018/0195900 A1* | 7/2018 | Delic ..................... H01L 31/107 |
| 2019/0230304 A1* | 7/2019 | Moore .................. H03M 1/1245 |
| 2019/0243312 A1* | 8/2019 | Chu ....................... H03K 21/38 |
| 2019/0305865 A1* | 10/2019 | Loinaz ................... H04J 3/0658 |
| 2020/0083896 A1* | 3/2020 | Mostafanezhad ... H03M 1/1265 |
| 2020/0116838 A1* | 4/2020 | Erdogan ................ G01S 7/4808 |

FOREIGN PATENT DOCUMENTS

EP 3537172 A1 * 9/2019 ........... G01S 7/4865

* cited by examiner

*Primary Examiner* — James R Hulka
(74) *Attorney, Agent, or Firm* — Oliff PLC

(57) ABSTRACT

The laser radar includes a clock generator, a projection unit configured to project pulse laser light in synchronization with a clock signal, a light reception unit configured to receive reflected light, a counter configured to count a counter value which is the number of clock signals generated from a projection timing until a light reception timing, a delay circuit in which a plurality of stages of delay units are connected and to which the clock signal is successively input, and a time calculation unit configured to calculate a round trip time of the pulse laser light on the basis of the counter value and the number of hops which is the number of stages of the delay units to which a head of the clock signal is transmitted in a period of the clock signal including the light reception timing.

14 Claims, 5 Drawing Sheets

LASER RADAR

CROSS-REFERENCE TO RELATED APPLICATION

This application is based on and claims the benefit of priority from earlier Japanese Patent Application No. 2020-179820 filed Oct. 27, 2020, the description of which is incorporated herein by reference.

BACKGROUND OF THE INVENTION

The present invention relates to a laser radar which calculates a distance to a target on the basis of a time period from when pulse laser light is projected until when reflected light of the pulse laser light is received.

In related art, there is known a laser radar which calculates a distance to a target on the basis of a time period from when pulse laser light is projected until when reflected light of the pulse laser light is received.

SUMMARY

A laser radar according to an aspect of the present disclosure includes
  a clock generator configured to generate a clock signal of a constant period,
  a projection unit configured to project pulse laser light in synchronization with the clock signal,
  a light reception unit configured to receive reflected light of the pulse laser light reflected by an object,
  a counter configured to count a counter value which is the number of the clock signals generated from a projection timing at which the pulse laser light is projected by the projection unit until a light reception timing at which the reflected light is received by the light reception unit,
  a delay circuit in which a plurality of stages of delay units which transmit input signals while delaying the input signals are connected and to which the clock signal is successively input,
  a time calculation unit configured to calculate a round trip time of the pulse laser light on the basis of the counter value counted by the counter and the number of hops which is the number of stages of the delay units to which a head of the clock signal is transmitted from when the head of the clock signal is input to the first delay unit until the light reception timing in a period of the clock signal including the light reception timing, and
  a distance calculation unit configured to calculate a distance to the object on the basis of speed of the pulse laser light and the round trip time calculated by the time calculation unit.

BRIEF DESCRIPTION OF THE DRAWINGS

In the accompanying drawings.

DETAILED DESCRIPTION OF THE PREFERRED EMBODIMENTS

Figure 1:
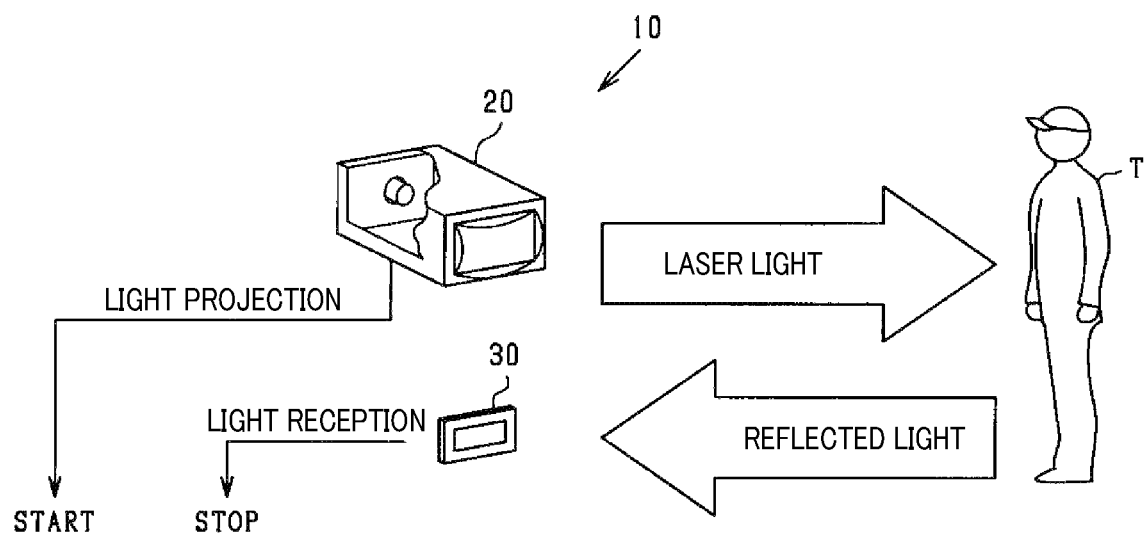
FIG. 1 is a schematic diagram illustrating outline of a laser radar.

The preferred embodiments according to the present disclosure will be described below with reference to the drawings.

As described above, there is known a laser radar which calculates a distance to a target on the basis of a time period from when pulse laser light is projected until when reflected light of the pulse laser light is received.

JP 03-0220814A discloses a pulse phase-difference encoding circuit that employs a pulse delay circuit in which a plurality of stages of delay units which delay pulse signals are connected, wherein a start pulse is input to the pulse delay circuit and when a stop pulse is then input to the pulse delay circuit, the pulse phase-difference encoding circuit encodes a phase difference between two pulses based on latched outputs of all of the delay units. JP 03-0220814A further discloses that such pulse phase-difference encoding circuit is applicable to a system that determines a distance to an object by projecting pulse laser light, receiving reflected wave and detecting phase difference between a pulse at a timing of projecting and a pulse at a timing of reception of the reflected wave.

By the way, when pulse the phase-difference encoding circuit disclosed in JP 03-0220814A are applied to a laser radar, the output of all the delay units is required to be reset to measure a minute time period using the delay circuit a subsequent time, after measuring a minute time period using the delay circuit. Thus, if measurement of a minute time period is executed as a result of reflected light from smoke, dust, or the like, existing from the laser radar to a target being received, there is a possibility that the minute time period cannot be measured, and eventually, a distance to the target cannot be calculated in a case where reflected light from the target is successively received.

The present disclosure has been made to solve the above-described problem, and a main object of the present invention is to provide a laser radar which is capable of calculating a distance to a target even in a case where reflected light is successively received.

First means for solving the above-described problem is a laser radar including
  a clock generator configured to generate a clock signal of a constant period,
  a projection unit configured to project pulse laser light in synchronization with the clock signal,
  a light reception unit configured to receive reflected light of the pulse laser light reflected by an object,
  a counter configured to count a counter value which is the number of the clock signals generated from a projection timing at which the pulse laser light is projected by the projection unit until a light reception timing at which the reflected light is received by the light reception unit, a delay circuit in which a plurality of stages of delay units which transmit input signals while delaying the input signals are connected and to which the clock signal is successively input, a time calculation unit configured to calculate a round trip time of the pulse laser light on the basis of the counter value counted by the counter and the number of hops which is the number of stages of the delay units to which a head of the clock signal is transmitted from when the head of the clock signal is input to the first delay unit until the light reception timing in a period of the clock signal including the light reception timing, and a distance calculation unit configured to calculate a distance to the object on the basis of speed of the pulse laser light and the round trip time calculated by the time calculation unit.

According to the above-described configuration, the clock generator generates a clock signal of a constant period. The projection unit projects pulse laser light in synchronization with the clock signal. It is therefore possible to make a generation timing of the clock signal correspond to a projection timing of laser light. The light reception unit receives reflected light of the pulse laser light reflected by an object. The counter counts a counter value which is the number of the clock signals generated from the projection timing at which the pulse laser light is projected by the projection unit until the light reception timing at which the reflected light is received by the light reception unit. It is therefore possible to calculate an approximate time period from the projection timing until the light reception timing using the counter value calculated by the counter.

The delay circuit is a circuit in which a plurality of stages of delay units which transmit input signals while delaying the input signals are connected, and to which the clock signal is successively input. Thus, the clock signal is input to the first delay unit sequentially from a head of the clock signal and is sequentially transmitted to the subsequent delay unit. Then, input of the clock signal is repeated such that when the end of the clock signal is input to the first delay unit, the head of the clock signal is input again to the first delay unit. Thus, the number of stages of the delay units to which the head of the clock signal is transmitted, from the first delay unit in the delay circuit represents a minute time period from when the head of the clock signal is input to the first delay unit. Note that a number of delay units are required to measure a time period from the projection timing to the light reception timing using only the delay circuit.

Thus, the time calculation unit calculates a round trip time of the pulse laser light on the basis of the counter value counted by the counter and the number of hops which is the number of stages of the delay units to which the head of the clock signal is transmitted from when the head of the clock signal is input to the first delay unit until the light reception timing in the period of the clock signal including the light reception timing. It is therefore possible to accurately calculate the round trip time of the pulse laser light while preventing the need of a number of delay units.

Further, the plurality of stages of delay units continue to repeatedly transmit the clock signal of the constant period. Further, the time calculation unit calculates a round trip time of the pulse laser light on the basis of the counter value and the above-described number of hops in the period of the clock signal including the light reception timing. This eliminates the need of resetting outputs of all the delay units to measure a minute time period next using the delay circuit after a minute time period is calculated using the delay circuit. It is therefore possible to successively execute calculation of a minute time period even in a case where measurement of a minute time period is executed as a result of reflected light from smoke, dust, or the like, existing from the laser radar to a target being received, and reflected light from the target is successively received. The distance calculation unit then calculates a distance to the object on the basis of speed of the pulse laser light and the round trip time calculated by the time calculation unit. It is therefore possible to calculate a distance to a target even in a case where the reflected light is successively received.

Specifically, a configuration as in a second means can be employed where the time calculation unit calculates the round trip time of the pulse laser light on the basis of an additional value of a time period obtained by multiplying the counter value counted by the counter by the constant period and a time period obtained by multiplying the number of hops by delay periods of signals delayed by the respective delay units.

In a third means, the clock signal of the constant period includes successive signals of a first level and successive signals of a second level which is different from the first level, and the delay units output the signals of the first level when the signals of the first level are input and output the signals of the second level when signals of a level different from the first level are input. According to such a configuration, the plurality of stages of delay units can continue to repeatedly transmit a signal which is the same as the clock signal and can sequentially transmit the head of the clock signal. Thus, the time calculation unit can calculate a round trip time of the pulse laser light on the basis of the above-described number of hops in the period of the clock signal including the light reception timing.

In a fourth means, the time calculation unit acquires output for measurement including outputs from the first delay unit to the delay unit to which the head of the clock signal can be transmitted in the constant period and sets the number of stages from the first delay unit to the delay unit corresponding to an edge between the signals of the first level and the signals of the second level in the output for measurement as the number of hops.

In a fifth means, the clock signal of the constant period includes successive signals of a first level and successive signals of a second level which is different from the first level, and the counter is configured to count the counter value when the clock signal of the constant period changes from the signals of the second level to the signals of the first level.

In a sixth means, the signals of the first level have a larger value than that of the signals of the second level.

In a seventh means, the counter comprises a first counter configured to count a first counter value which is the number of the clock signals and a second counter configured to count, at a different timing from that of the first counter in the clock signals, a second counter value which is the number of the clock signals, the laser radar further comprises a selection unit configured to select one of the first counter value and the second counter value as a third counter value, and the time calculation unit calculates the round trip time of the pulse laser light on the basis of the third counter value and the number of hops.

According to the above-described configuration, the time calculation unit acquires output for measurement including outputs from the first delay unit to the delay unit to which the head of the clock signal can be transmitted in the constant period. It is therefore possible to acquire information necessary for calculating the number of stages of the delay units to which the head of the clock signal is transmitted in the constant period of the clock signal. Further, it is possible for the time calculation unit to easily calculate the number of hops by setting, as the number of hops, the number of stages from the first delay unit to the delay unit corresponding to an edge between the signals of the first level and the signals of the second level in the output for measurement.

First Embodiment

A laser radar according to the first embodiment of the present disclosure will be specifically described below.

A laser radar 10 according to the present embodiment is configured to project pulse laser light to a target T, to receive reflected light of the pulse laser light reflected by a target T and to calculate a distance from the laser radar 10 to the target T by multiplying the speed of light which is speed of the pulse laser light by a time period obtained by dividing a round trip time T1 of the pulse laser light by 2. As illustrated in FIG. 1, the laser radar 10 according to the present embodiment includes a projection unit 20, a light reception unit 30, a field programmable gate array (FPGA) 40 and a distance calculation unit 50 and the like. The projection unit 20 projects pulse laser light by a START signal which is in synchronization with a clock signal. The light reception unit 30 receives reflected light of the pulse laser light reflected by a target T (object) and outputs a STOP signal when the reflected light is detected.

Figure 2:
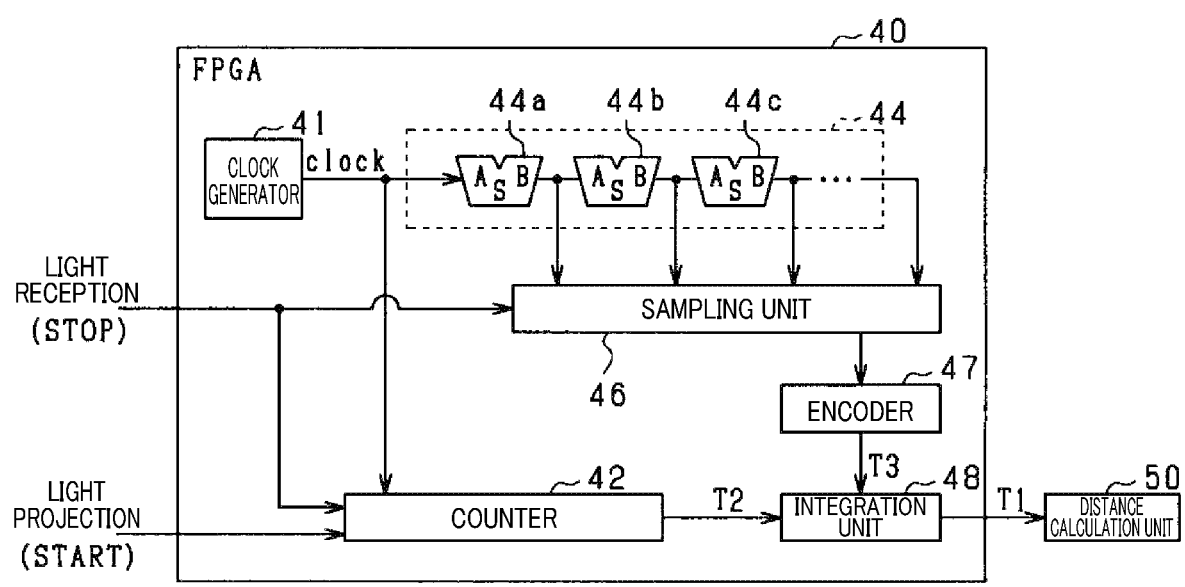
FIG. 2 is a block diagram illustrating a configuration of an FPGA in a first embodiment.

The FPGA 40 calculates a time period from the START signal to the STOP signal (a round trip time T1 of the pulse laser light). FIG. 2 is a block diagram illustrating a configuration of FPGA 40. The FPGA 40 includes a clock generator 41, a counter 42, a delay circuit 44, a time calculation unit and the like. The time calculation unit includes a fraction calculation unit (a sampling unit 46, and an encoder 47), an integration unit 48, and the like.

The clock generator 41 generates a clock signal of, for example, 400 [MHz] (several hundred [MHz]), that is, a 2.5 [ns] period (constant period). The clock signal includes signals of "1" (high level, first level) of 1.25 [ns] and successive signals of "0" (low level, second level) of 1.25 [ns]. In other words, the clock signal includes signals of the first level which are successive from a start timing and successive signals of the second level which is different from the first level.

The counter 42 counts a counter value which is the number of the clock signals generated from a timing at which the START signal which is in synchronization with a generation timing of a clock signal (head) is input until a timing at which the STOP signal is input. In other words, the counter 42 counts the number of the clock signals generated from a projection timing at which the pulse laser light is projected by the projection unit 20 until a light reception timing at which reflected light is received by the light reception unit 30. The light reception unit 30 detects the reflected light when intensity of the reflected light exceeds a determination value Ir and sets a time point at which the intensity exceeds the determination value Ir as the light reception timing. A value of the counter value is initially 0 and is incremented by 1 when a rising edge (rising) of the clock signal from "0" to "1" is detected until the light reception timing. The counter 42 calculates a counter time T2 which is a time period obtained by multiplying the counter value by the period of the clock signal. The counter 42 outputs the calculated counter time T2 to the integration unit 48.

The delay circuit 44 includes a plurality of delay units 44a, 44b, 44c, . . . which are connected in series. The respective delay units transmit input signals while delaying the input clock signals from the clock generator 41. The delay circuit 44 includes a number of delay units which can delay the input signal for a time period longer than one period of the clock signal. In other words, when one period of the clock signal has elapsed since a head of a signal is input to the first delay unit 44a, the head of the signal does not reach the last delay unit.

Each delay unit, which includes, for example, a carry circuit of an adder, adds an input signal and outputs a carry signal to the next delay unit and the sampling unit 46. Each adder is a binary carry circuit and there may be 0 and 1 as values processed by each adder. A carry signal from the previous adder and 1 are input to each adder. A clock signal and 1 are input to the first delay unit 44a. Thus, each delay unit outputs 1 as the carry signal while the clock signal is 1 and outputs 0 as the carry signal while the clock signal is 0. In other words, the respective delay units output signals of the first level when the signals of the first level are input and output signals of the second level (different from the first level) when the signals of the level different from the first level are input.

Figure 3:
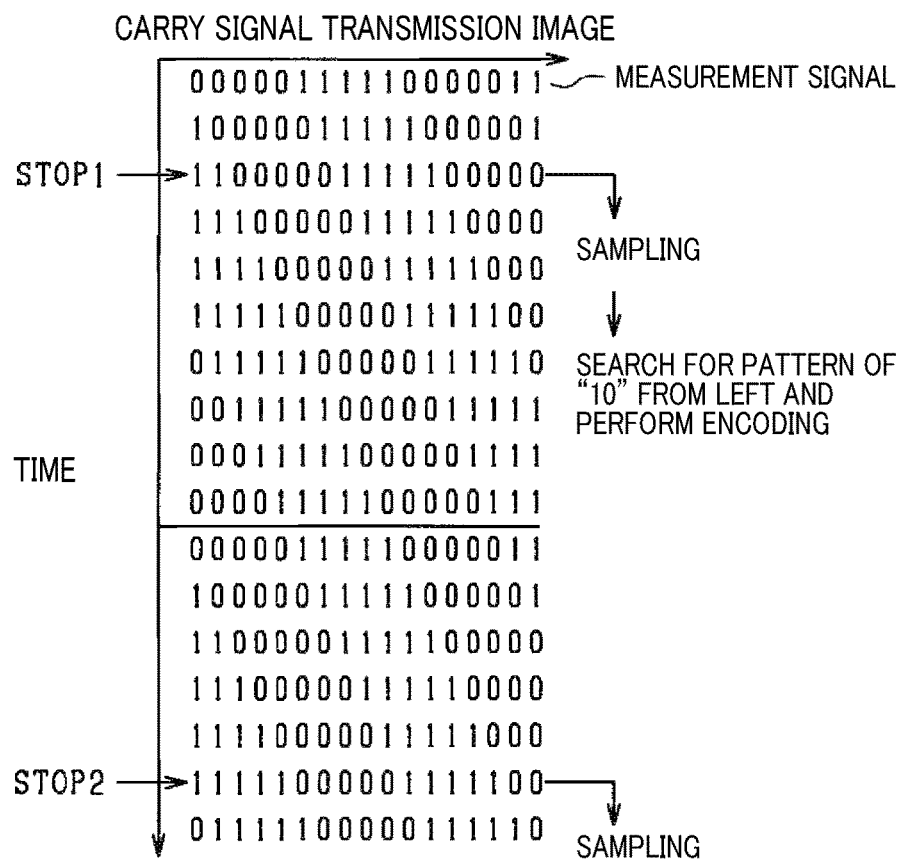
FIG. 3 is a view illustrating transmission image of a carry signal.

The sampling unit 46 samples output of the respective delay units in the delay circuit 44 when the STOP signal is input from the light reception unit 30. The sampling unit 46 connects the sampled output of the respective delay units and acquires binary output for measurement, for example as shown in FIG. 3. For example, if output of the delay units 44a, 44b, 44c, . . . is respectively "1", "1", "0", . . . , the output for measurement becomes 110 . . . . The sampling unit 46 outputs the acquired output for measurement to the encoder 47.

The encoder 47 receives input of the output for measurement and calculates a fractional time T3 which is a time period from the head of the clock signal until the light reception timing in the period of the clock signal including the light reception timing on the basis of the output for measurement.

Specifically, as illustrated in FIG. 3, a measurement signal changes over time by the carry signal being sequentially transmitted by the delay units. For example, when a STOP1 signal is input, the sampling unit 46 samples output of the respective delay units at that time to acquire output for measurement. In FIG. 3, "11000001111100000" is acquired as the output for measurement. In the output for measurement, "10" represents a rising edge of the clock signal from "0" to "1", that is, the head of the clock signal.

Thus, the encoder 47 searches for "10" from the left in the acquired output for measurement and calculates the number of stages that "10" proceeds. The number of stages that "10" proceeds in the output for measurement represents the number of hops which is the number of stages of the delay units to which the head of the clock signal is transmitted from when the head of the clock signal is input to the first delay unit 44a until the light reception timing in the period of the clock signal including the light reception timing. The encoder 47 acquires the output for measurement including output from the first delay unit 44a to a delay unit to which the head of the clock signal can be transmitted in one period of the clock signal and sets the number of stages from the first delay unit 44a to a delay unit corresponding to an edge between the signals of the first level of "1" and the signals of the second level of "0" in the output for measurement as the number of hops. The encoder 47 multiplies the number of hops by the delay periods of signals delayed by the respective delay units to calculate the fractional time T3. In other words, the encoder 47 encodes the output for measurement to calculate the fractional time T3. The encoder 47 outputs the calculated fractional time T3 to the integration unit 48. Note that the sampling unit 46 and the encoder 47 constitute the fraction calculation unit.

The integration unit 48 adds the counter time T2 input from the counter 42 and the fractional time T3 input from the encoder 47 to calculate the round trip time T1 of the pulse laser light (T1=T2+T3). In other words, the integration unit 48 calculates the round trip time T1 of the pulse laser light on the basis of an additional value of the counter time T2 and the fractional time T3. The integration unit 48 outputs the calculated round trip time T1 of the pulse laser light to the distance calculation unit 50. The distance calculation unit 50 is mounted to the laser radar 10. Note that the sampling unit 46, the encoder 47 and the integration unit 48 constitute the time calculation unit.

The distance calculation unit 50 multiplies the speed of light, which is the speed of the pulse laser light, by a time period obtained by dividing the round trip time T1 of the pulse laser light by 2 to calculate a distance from the laser radar 10 to the target T. In other words, the distance calculation unit 50 calculates a distance to an object on the basis of the speed of the pulse laser light and the round trip time T1 of the pulse laser light calculated by the time calculation unit. The distance calculation unit 50 may be provided in the FGPA 40 or be configured by one or more other integrated circuit.

Configurations of each unit in the laser lidar 10 have been described.

In the present embodiments, the clock generator 41, the counter 42, the delay circuit 44, the time calculation unit and the distance calculation unit 50 are provided in the FPGA 40, although the present disclosure is not limited to this configuration. For example, these units can be configured by one or more of integrated circuits exemplified by Application Specific Integrated Circuit (ASIC), Programmable Logic Device (PLD) such as FGPA, Field Programmable Analog Array (FPAA) or the like. All of the units can be configured by one integrated circuit such as the FGPA 40 as shown in the present embodiments or by a plurality of integrated circuits. One unit may also be configured by a plurality of integrated circuits.

Figure 4:
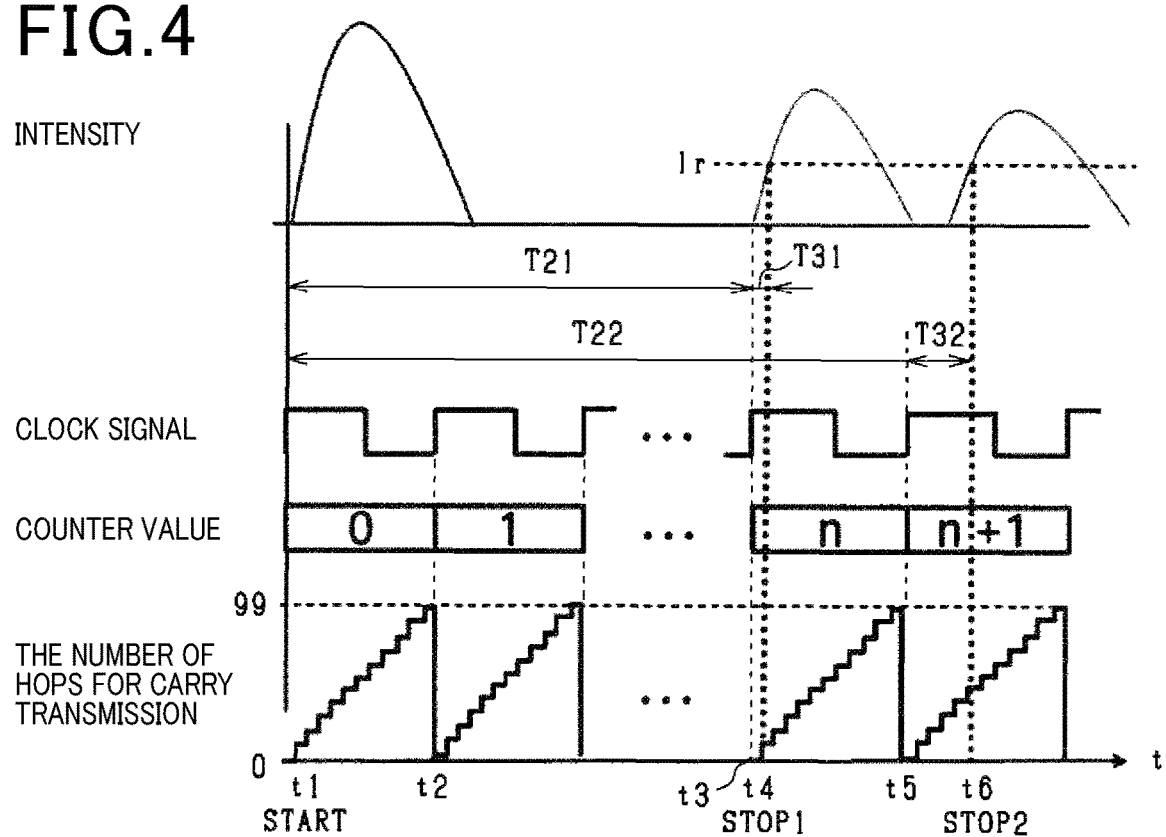
FIG. 4 is a time chart illustrating an aspect where a round trip time of pulse laser light is calculated.

Next, operation of the laser radar 10 will be described with reference to a time chart shown in FIG. 4. FIG. 4 is a time chart illustrating an aspect where the round trip time of the pulse laser light is calculated.

At time t1, the pulse laser light is projected in synchronization with generation of the clock signal, and the intensity of the pulse laser light increases. The counter 42 starts counting the counter value from 0. The number of hops (the number of hops for carry transmission) which is the number of stages of the delay units to which the head of the clock signal is transmitted in one period of the clock signal increases from 0 over one period of the clock signal. Note that here, an example is indicated where the number of hops increases from 0 to 99 in one period of the clock signal while the present disclosure is not limited to this range.

At time t2, the head of the clock signal of the next period is input to the delay circuit 44 while the clock signal of the next period is simultaneously input to the counter 42. At this timing, the counter 42 increments the counter value from 0 to 1. The number of hops increases from 0 to 99 again.

At time t4, if the pulse laser light is reflected by, for example, smoke, and intensity of the reflected light exceeds the determination value Ir, the reflected light is detected, and a time point at which the reflected light is detected becomes a first light reception timing. In this event, the counter time T21 becomes a time period obtained by multiplying the counter value=n by the period of the clock signal. The fractional time T31 is a time period obtained by multiplying the number of hops from time t3 to time t4 by the delay periods of signals delayed by the respective delay units. Then, the integration unit 48 adds the counter time T21 and the fractional time T31 to calculate a round trip time T11 of the pulse laser light.

At time t6, if the pulse laser light is reflected by, for example, the target T, and intensity of the reflected light exceeds the determination value Ir, the reflected light is detected, and a time point at which the reflected light is detected becomes a second light reception timing. In this event, the counter time T22 is a time period obtained by multiplying the counter value=n+1 by the period of the clock signal. The fractional time T32 is a time period obtained by multiplying the number of hops from time t5 to time t46 by delay periods of signals delayed by the respective delay units. Then, the integration unit 48 adds the counter time T22 and the fractional time T32 to calculate a round trip time T12 of the pulse laser light.

Thereafter, the distance calculation unit 50 multiplies the speed of light which is the speed of the pulse laser light respectively by time periods obtained by dividing the round trip times T11 and T12 of the pulse laser light by 2 to calculate distances from the laser radar 10 respectively to the smoke and the target T.

The present embodiment described in detail above has the following advantages.

The clock generator 41 generates the clock signal of the constant period (2.5 [ns] period). The projection unit 20 projects the pulse laser light in synchronization with the clock signal. It is therefore possible to make a generation timing of the clock signal correspond to a projection timing of the laser light. The light reception unit 30 receives reflected light of the pulse laser light reflected by an object. The counter 42 counts a counter value which is the number of the clock signals generated from the projection timing at which the pulse laser light is projected by the projection unit 20 until the light reception timing at which the reflected light is received by the light reception unit 30. It is therefore possible to calculate an approximate time period from the projection timing to the light reception timing using the counter value counted by the counter 42.

The delay circuit 44 is a circuit in which a plurality of stages of delay units 44a, 44b, 44c, . . . which transmit input signals while delaying the input signals are connected, and to which the clock signal is successively input. Thus, the clock signal is input to the first delay unit 44a sequentially from the head of the clock signal, and is sequentially transmitted to the subsequent delay units 44b, 44c, . . . . Then, input of the clock signal is repeated such that when the end of the clock signal is input to the first delay unit 44a, the head of the clock signal is input to the first delay unit 44a again. Thus, a minute time period from when the head of the clock signal is input to the first delay unit 44a can be represented by the number of stages of the delay units to which the head of the clock signal is transmitted, from the first delay unit 44a in the delay circuit 44. Note that a number of delay units 44a, 44b, 44c, . . . are required to measure a time period from the projection timing to the light reception timing only using the delay circuit 44.

The time calculation unit calculates a round trip time of the pulse laser light on the basis of the counter value counted by the counter 42 and the number of hops which is the number of stages of the delay units to which the head of the clock signal is transmitted from when the head of the clock signal is input to the first delay unit 44a until the light reception timing in the period of the clock signal including the light reception timing. It is therefore possible to accurately calculate a round trip time of the pulse laser light while preventing the need of a number of delay units.

The plurality of stages of delay units 44a, 44b, 44c, . . . continue to repeatedly transmit the clock signal of the constant period. Then, the time calculation unit calculates a round trip time of the pulse laser light on the basis of the counter value and the above-described number of hops in the period of the clock signal including the light reception timing. This eliminates the need to reset output of all the delay units 44a, 44b, 44c to measure a subsequent minute time period using the delay circuit 44, after a minute time period is measured using the delay circuit 44. It is therefore possible to successively execute measurement of a minute time period even in a case where measurement of a minute time period is executed as a result of reflected light from smoke, dust, or the like, between the laser radar 10 to the target T, and reflected light from the target T being successively received. Then, the distance calculation unit 50 calculates a distance to the object on the basis of the speed of the pulse laser light and the round trip time calculated by the time calculation unit. It is therefore possible to calculate a distance to the target T even in a case where the reflected light is successively received.

On the other hand, in a conventional laser radar such as the laser radar using the pulse phase-difference encoding circuit of JP 03-0220814A, one to four periods (several periods) of the clock signal are required to reset output of all the delay units after a minute time period is measured using the delay circuit. As a result, when a conventional laser radar receives reflected light from one target and receive further reflected light from another target immediately after the first reception, the conventional laser radar cannot measure a minute time period for the other target using the delay circuit 44 during that period unless reset of the previous output of the delay units has completed. Therefore, the conventional laser radar cannot accurately measure round trip times of the pulse laser light for a plurality of targets and accurately calculate distances thereto when successively receiving reflected light from the plurality of targets.

The clock signal of the constant period includes successive signals of the first level of "1" and successive signals of the second level of "0" which is different from the first level, and the delay units 44a, 44b, 44c, . . . output the signals of the first level of "1" when the signals of the first level of "1" are input and outputs the signals of the second level of "0" when signals of a level different from the first level are input. According to such a configuration, the plurality of stages of delay units 44a, 44b, 44c, . . . , can continue to repeatedly transmit a signal which is the same as the clock signal of the constant period and can sequentially transmit the head of the clock signal. Thus, the time calculation unit can calculate the round trip time of the pulse laser light on the basis of the above-described number of hops in the period of the clock signal including the light reception timing.

The time calculation unit acquires output for measurement including output from the first delay unit 44a to a delay unit to which the head of the clock signal can be transmitted in the constant period (2.5 [ns]). It is therefore possible to acquire information necessary for calculating the number of stages of the delay units to which the head of the clock signal is transmitted in the constant period of the clock signal. Then, the time calculation unit can easily calculate the number of hops by setting the number of stages from the first delay unit 44a to a delay unit corresponding to an edge between the signals of the first level of "1" and the signals of the second level of "0" in the output for measurement as the number of hops.

Second Embodiment

A second embodiment will be described below with reference to the drawings mainly concerning differences from the first embodiment. A laser radar in the present embodiment includes a first counter configured to count a first counter value, a second counter configured to count a second counter value and a selection unit configured to select one of the first counter value and the second counter value as a third counter value. The time calculation unit then calculates a round trip time T1 of the pulse laser light on the basis of the third counter value and the fractional time T3 calculated by the fraction calculation unit.

Figure 5:
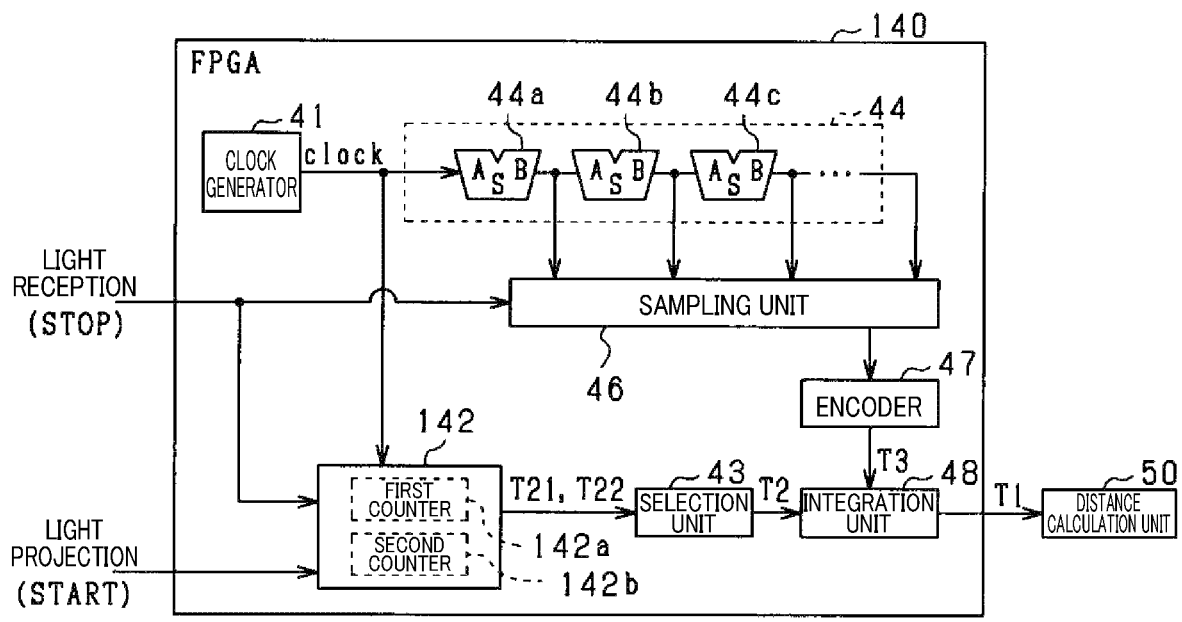
FIG. 5 is a block diagram illustrating a configuration of an FPGA in a second embodiment.

As illustrated in FIG. 5, the FPGA 140 includes a counter 142 and a selection unit 43 in place of the counter 42 of the FPGA 40 in the first embodiment. Other components of the FPGA 140 are the same as the components of the FPGA 40.

Figure 6:
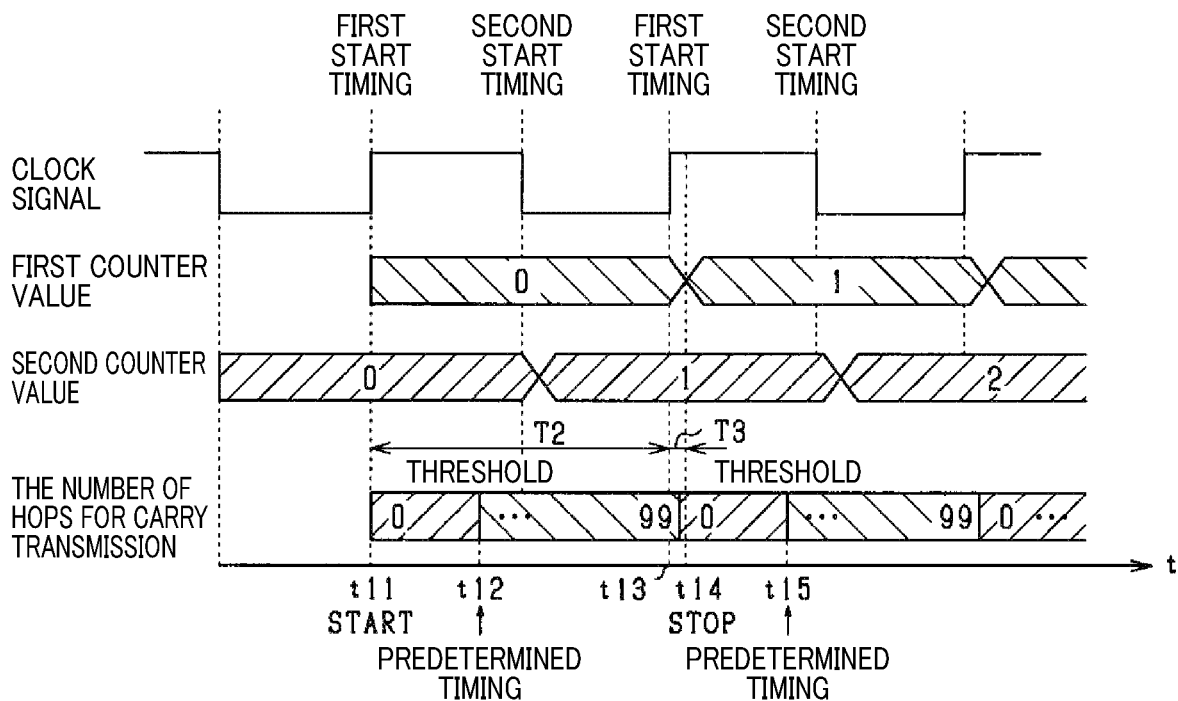
FIG. 6 is a time chart illustrating an aspect where a round trip time of pulse laser light is calculated.
Figure 7:
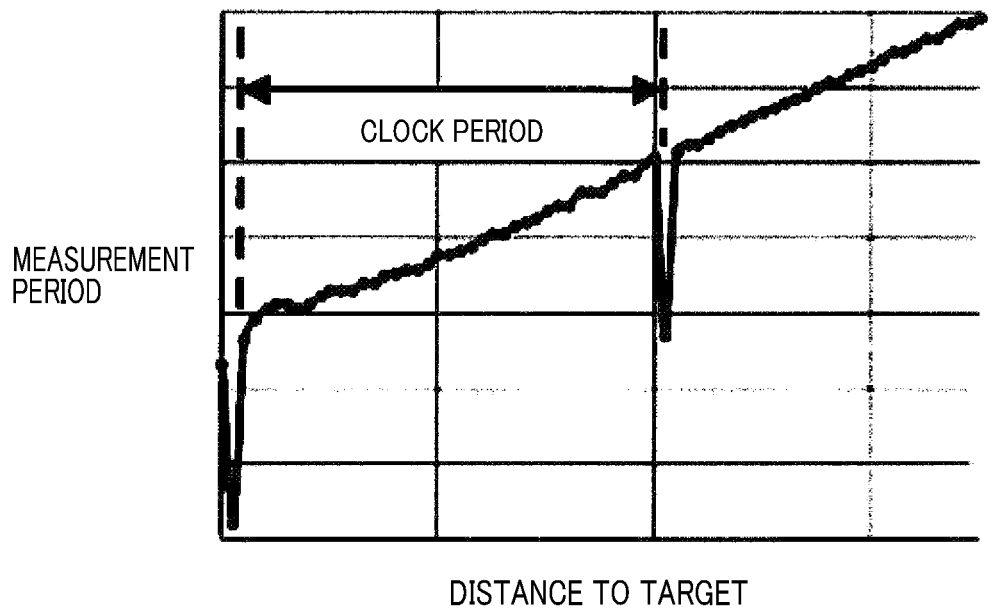
FIG. 7 is a graph indicating a relationship between a distance to a target and a measurement period.

For example, in a case where a light reception timing (STOP) overlaps a first start timing which is a rise of the clock signal (a start timing of the signals of the first level of "1") from time t13 to t14 in FIG. 6, it becomes unstable which of a value of "0" before the first start timing or a value of "1" after the first start timing, the first counter value (which is the same as the counter value in the first embodiment) takes. In this case, as illustrated in FIG. 7, there is a possibility that an outlier may occur in a measurement period of the round trip time of the pulse laser light in accordance with a distance to the target T. Meanwhile, as illustrated in FIG. 6, in this case, the light reception timing does not overlap a second start timing which is falling of the clock signal (a start timing of the signals of the second level of "0"), and thus, the second counter value (a counter value shifted from the first counter value by a half period of the clock signal) becomes a stable value.

Thus, the counter 142 includes a first counter 142a and a second counter 142b (see FIG. 5). The first counter 142a counts the number of rising edges from "0" to "1" of the clock signal from the projection timing to the light reception timing, that is, the number of times that the signals of the first level of "1" start, from the projection timing to the light reception timing as the first counter value. The second counter 142b counts the number of falling edges from "1" to "0" of the clock signal from the projection timing to the light reception timing, that is, the number of times the signals of the second level of "0" start, from the projection timing to the light reception timing as the second counter value.

The selection unit 43 sets a threshold which divides the number of hops for carry transmission into a first portion and a last portion at a position which does not overlap rising and falling of the clock signal. The clock signal rises and falls respectively around hop numbers "0" and "50" for carry transmission, and thus, for example, "30" is set as the threshold. The selection unit 43 selects the second counter value as the third counter value in a case where the number of hops for carry transmission is equal to or less than "30" and selects the first counter value as the third counter value in a case where the number of hops for carry transmission exceeds "30". In other words, the selection unit 43 selects the second counter value as the third counter value at a timing before predetermined timings t12 and t15 (corresponding to the threshold=30) which are timings after the first start timing which is a start timing of the signals of the first level of "1" and before the second start timing which is a start timing of the signals of the second level of "0" and selects the first counter value as the third counter value at a timing after the predetermined timings t12 and t15. The selection unit 43 then outputs a counter time T2 obtained by multiplying the third counter value by the period of the clock signal to the integration unit 48 (see FIG. 5).

The integration unit 48 adds the counter time T2 and the fractional time T3 input from the encoder 47 to calculate the round trip time T1 of the pulse laser light (T1=T2+T3).

The present embodiment described in detail above has the following advantages. Here, only advantages different from the advantages in the first embodiment will be described.

The first counter 142a counts the first counter value which is the number of times that signals of the first level of "1" have started, from the projection timing at which the pulse laser light is projected by the projection unit 20 to the light reception timing at which the reflected light is received by the light reception unit 30. The second counter 142b counts the second counter value which is the number of times of starting of the signals of the second level of "0" from the projection timing to the light reception timing. It is therefore possible to calculate an approximate time period from the projection timing to the light reception timing by the first counter value and the second counter value respectively counted by the first counter 142a and the second counter 142b.

The selection unit 43 selects the second counter value as the third counter value at a timing before the predetermined timings t12 and t15 which are timings after the first start timing and which are before the second start timing in each period of the clock signal and selects the first counter value as the third counter value at a timing after the predetermined timings t12 and t15. Thus, in a case where the light reception timing overlaps the first start timing, the second counter value is selected as the third counter value, so that the third counter value can be made a stable value. In a similar manner, in a case where the light reception timing overlaps the second start timing, the first counter value is selected as the third counter value, so that the third counter value can be made a stable value.

The fraction calculation unit calculates the fractional time T3 which is a time period from the head of the clock signal until the light reception timing in the period of the clock signal including the light reception timing. The time calculation unit calculates the round trip time T1 of the pulse laser light on the basis of the third counter value and the fractional time T3 calculated by the fraction calculation unit. Thus, the round trip time T1 of the pulse laser light can be accurately calculated on the basis of the counter time T2 calculated by the third counter value which is the count value of the clock signal and the fractional time T3 of the clock signal at the laser radar 10 which calculates the round trip time T1 of the pulse laser light. Further, the distance calculation unit 50 can accurately calculate a distance to an object on the basis of speed of the pulse laser light and the round trip time T1 calculated by the time calculation unit.

Note that the second embodiment can be changed and implemented as follows. The same reference numerals will be assigned to portions which are the same as the portions in the second embodiment and description thereof will be omitted.

Figure 8:
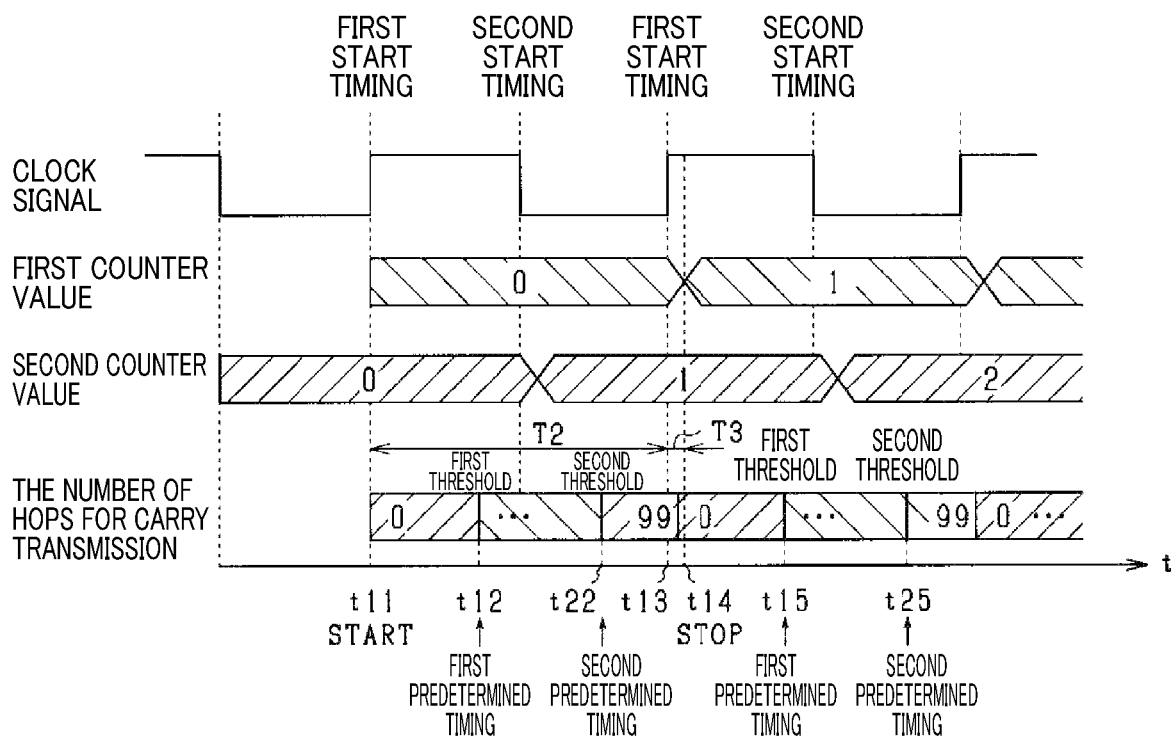
FIG. 8 is a time chart illustrating a modified example of the aspect where the round trip time of the pulse laser light is calculated.

Only the selection unit 43 in the second embodiment can be changed as follows. As illustrated in FIG. 8, the selection unit 43 selects, in each period of the clock signal, the second counter value as the third counter value at a timing before a first predetermined timing t12 which is a timing after the first start timing which is a start timing of the signals of the first level of "1" and which is before the second start timing which is a start timing of the signals of the second level of "0", selects the second counter value as the third counter value at a timing after second predetermined timings t22 and t25 which are timings after the second start timing which is a start timing of the signals of the second level of "0" and before an end timing of the signals of the second level of "0", and selects the first counter value as the third counter value at a timing after the first predetermined timing and before the second predetermined timings.

Also, according to the above-described configuration, in a case where the light reception timing overlaps the first start timing, the second counter value is selected as the third counter value, so that the third counter value can be made a stable value. In a similar manner, in a case where the light reception timing overlaps the second start timing, the first counter value is selected as the third counter value, so that the third counter value can be made a stable value. Thus, the round trip time T1 of the pulse laser light can be accurately calculated on the basis of the counter time T2 calculated by the third counter value which is a count value of the clock signal and the fractional time T3 of the clock signal at the laser radar 10 which calculates the round trip time T1 of the pulse laser light.

Figure 9:
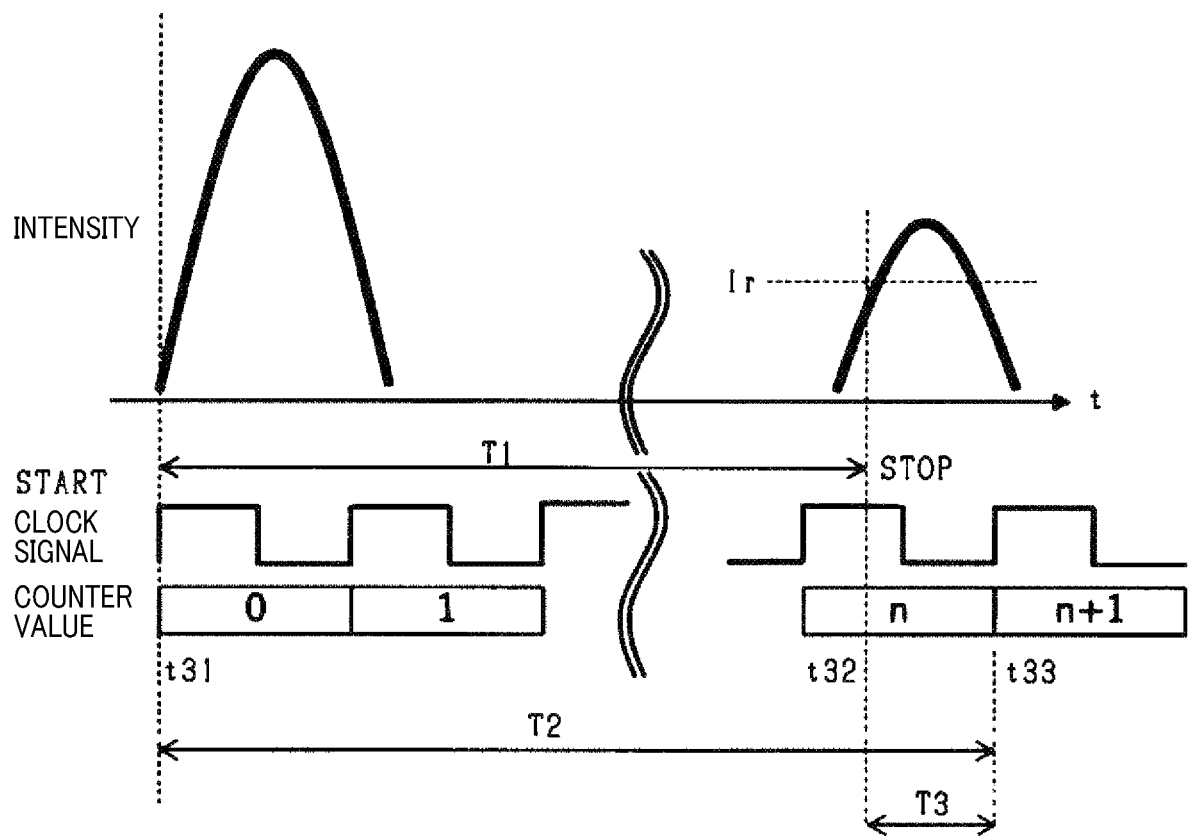
FIG. 9 is a time chart illustrating another modified example of the aspect where the round trip time of the pulse laser light is calculated.

As illustrated in FIG. 9, in the period of the clock signal including the light reception timing t32 (STOP), a time period from the light reception timing t32 to a rising timing t33 of rising from "0" to "1" of the clock signal can be set as the fractional time T3 and a time period from the projection timing t31 to the rising timing t33 can be set as the counter time T2. In this case, the round trip time T1 of the pulse laser light can be calculated by subtracting the fractional time T3 from the counter time T2 (T1=T2−T3).

Also according to such a configuration, by applying the first counter 142a, the second counter 142b and the selection unit 43 in the second embodiment, in a case where the light reception timing overlaps the first start timing, the second counter value is selected as the third counter value, so that the third counter value can be made a stable value. In a similar manner, in a case where the light reception timing overlaps the second start timing, the first counter value is selected as the third counter value, so that the third counter value can be made a stable value. Thus, the round trip time T1 of the pulse laser light can be accurately calculated on the basis of the counter time T2 calculated by the third counter value which is a count value of the clock signal and the fractional time T3 of the clock signal at the laser radar 10 which calculates the round trip time of the pulse laser light. Then, the distance calculation unit 50 can accurately calculate a distance to an object on the basis of speed of the pulse laser light and the round trip time T1 calculated by the time calculation unit.

In the clock signal, it is also possible to consider signals of "1" (high level) as signals of the second level and consider signals of "0" (low level) as signals of the first level. In this case, in FIG. 6, the first start timing and the second start timing are replaced with each other, positions of the predetermined timings change in accordance with the replacement, and the first counter value and the second counter value are replaced with each other. Also according to such a configuration, operational effects similar to the operational effects in the second embodiment can be provided.

Note that the first and the second embodiments can be changed and implemented as follows. The same reference numerals will be assigned to portions which are the same as the portions in the first and the second embodiments, and description thereof will be omitted.

In the clock signal, there is an arbitrary ratio between a length of the signals of "1" (high level) and a length of the signals of "0" (low level).

It is also possible to correct the round trip time T1 of the pulse laser light in view of at least one of a time period from when the START signal is generated until when the pulse laser light is projected, a processing time period for the counter 42, the first counter 142a and the second counter 142b to calculate the counter times T2, T21 and T22, a processing time period of the encoder 47, a processing time period of the integration unit 48 or change of the light reception timing related to the intensity of the reflected light.

It is also possible to employ buffer circuits, or the like, which output input signals as is as the delay units 44a, 44b, 44c, . . . , as well as adders which add the input signals and output a carry signal.

The counter value is not limited to a value starting from 0 and may be a value starting from 1. In this case, it is only necessary to multiply a value obtained by subtracting 1 from the counter value by the period of the clock signal to calculate the counter time T2.

It is also possible to employ a time point at which intensity of the reflected light becomes a peak value (maximum value) as the light reception timing of the reflected light as well as a time point at which intensity of the reflected light exceeds the determination value Ir.

What is claimed is:

1. A laser radar comprising:
a clock generator configured to generate a clock signal repeated, every constant period, between mutually different first and second levels changing via a signal edge thereof;
a projection unit configured to project pulse laser light in synchronization with the signal edge of the clock signal;
a light reception unit configured to receive reflected light of the pulse laser light reflected by an object;
a counter configured to count, as a counter value, a number of the clock signals generated a period between a projection timing at which the pulse laser light is projected by the projection unit and a light reception timing at which the reflected light is received by the light reception unit;
a delay circuit provided with a plurality of stages of delay units connected in series, each of the delay units having a specified delay time, the clock signal being repeatedly inputted to one of the delay units and being delayed, every repetition, by an amount of the specified delay time and the delayed clock signal being inputted to a next-stage delay unit;
a stage-number calculation unit configured to calculate a number of transmission stages showing that a head of the clock signal inputted to a first-stage delay unit of the delay units is transmitted to which one of the delay units, in a period from a timing at which the head of the clock signal has been inputted to the first-stage delay unit to a timing at which the reflected light has been received, in each of the periods of the clock signal during each of which the first and second levels are changed;
a time calculation unit configured to calculate a round trip time of the pulse laser light projected and the reflected light thereof is returned, on a basis of the counter value, the constant period, the number of transmission stages calculated, and the specified delay time; and
a distance calculation unit configured to calculate a distance to the object on a basis of speed of the pulse laser light and the round trip time calculated by the time calculation unit.

2. The laser radar according to claim 1,
wherein the time calculation unit is configured to calculate the round trip time of the pulse laser light on a basis of an additional value of a time period obtained by multiplying the counter value by the constant period, and a time period obtained by multiplying the number of transmission stages by the specified delay of the respective delay units.

3. The laser radar according to claim 1,
wherein the clock signal repeats, at the constant period, successive levels including of the first level and the second level, and
each of the delay units is configured to output a signal of the first level when the signal of the first level is inputted input and output a signal of the second level when a signal of a level different from the first level is inputted.

4. The laser radar according to claim 3,
wherein the stage-number calculation unit is configure to acquire output for measurement including outputs from the first-stage delay unit to the delay unit to which the head of the clock signal is transmitted in the constant period, and calculate, as the number of transmission stages, the number of transmission stages from the first-stage delay unit to the delay unit corresponding to the edge between the signals of the first level and the signals of the second level in the output for measurement.

5. The laser radar according to claim 1,
the counter is configured to count the counter value when the clock signal of the constant period changes from the signals of the second level to the signals of the first level.

6. The laser radar according to claim 5,
wherein the signals of the first level have a larger value than a value of the signals of the second level.

7. The laser radar according to claim 1,
wherein the counter comprises a first counter configured to count a first counter value showing the number of the clock signals and a second counter configured to count, at a different timing from the count of the first counter, a second counter value showing the number of the clock signals,
the laser radar further comprises a selection unit configured to select one of the first counter value and the second counter value as a third counter value based on a threshold assigned to the number of transmission stages, the threshold avoiding a reception timing of the reflected light from overlapping the signal edges of the clock signal, and the time calculation unit calculates the round trip time of the pulse laser light on the basis of the third counter value adopted instead of the counter value, the constant period, the number of transmission stages calculated, and the specified delay time.

8. The laser radar according to claim 7, wherein the reception timing is set, in each of the repeated constant periods of the clock signal, between first and second start timings agreeing with the signal edges of the clock signal, wherein the first start timing is assigned to a rise timing of the first level, and the second start timing is assigned to a falling timing of the first level as well as a rise timing of the second level.

9. The laser radar according to claim 8, wherein the selection unit is configured to select, as the third counter value, the second counter value when the number of transmission stages is equal to or less than the threshold and select, as the third counter value, the first counter value when the number of transmission stages is over the threshold, in each of the repeated constant periods of the clock signal.

10. The laser radar according to claim 9, wherein the first level and the second level of the clock signal are set, respectively, to a high level of 1 and a low level of 0 which are repeated in time.

11. The laser radar according to claim 9, wherein the first level and the second level of the clock signal are set, respectively, to a low level of 0 and a high level of 1 which are repeated in time.

12. The laser radar according to claim 9, wherein the threshold is a single threshold during each of the repeated constant periods of the clock signal.

13. The laser radar according to claim 9, wherein the threshold includes two thresholds during each of the repeated constant periods of the clock signal, the two thresholds being a first threshold and a second threshold, the first threshold being assigned to a first predetermined timing which falls into a duration between the first and second start timings in each of the repeated constant periods of the clock signal, the second threshold being assigned to a second predetermined timing which falls into a duration between the second start timing of one of the repeated periods of the clock signal and the first start timing of the next period of the clock signal.

14. The laser radar according to claim 13, wherein the selection unit is configured to select, as the third counter value, in each of the repeated constant periods of the clock signal, the second counter value when the number of transmission stages is equal to or less than the first threshold, select, as the third counter value, the second counter value when the number of transmission stages is over the second threshold, and select, as the third counter value, the first counter value when the number of transmission stages is between the first and second thresholds.

* * * * *